United States Patent Office 3,240,062
Patented Mar. 15, 1966

3,240,062
FLOW-CONTROLLING APPARATUS
Curt Johan Fredriksson, Ekebyvagen 13,
Djursholm, Sweden
Filed Dec. 5, 1962, Ser. No. 242,545
4 Claims. (Cl. 73—228)

The present invention relates to apparatus for controlling or supervising fluid mediums flowing through a conduit and particularly to an apparatus for supervising the flow of air in the conduits of a ventilating or air conditioning plant.

A flow supervising apparatus is known, comprising a shaft, means for rotatably mounting said shaft in the wall of a conduit for the flowing medium so as to have one end portion extending transversely within said conduit and another end portion extending freely through to the outside of said conduit. A measuring vane is attached to the end portion of said shaft extending inside said conduit. Attached at the free end portion of said shaft outside the conduit is a mercury tube switch for controlling the electrical circuit leading to an electrically operated valve, an electrical fan motor or the like.

However, supervising apparatus of this kind have been found to have several disadvantages. The weight of the mercury in the mercury switch has a detrimental effect on the reciprocable motion in the operation of the vane, and the mercury in the switch further is liable to "quiver" or vibrate in positions close to the breaking or closing position, which makes a distinct operation of the switch impossible. It has also been difficult to perform a sufficienty exact setting of the operative positions of the mercury switch on the shaft.

The primary object of the invention therefore is to provide a supervising apparatus of the aforementioned kind which is sensitive to even very small variations in the flow of the fluid medium and which can be set in predetermined operating positions with maximum exactness.

Another object of the invention is to provide a flow supervising apparatus which is reliable in operation and which requires a minimum of maintenance.

According to the invention at least one radially extending member is mounted on the free end portion of said shaft outside the conduit, said radially extending member and said vane which is unsymmetrically disposed with respect to said shaft, constituting a system which is substantially balanced in relation to said rotatable shaft, at least one electrical contact member being operatively connected with said radially extending member, and electrical circuit means being controlled by said contact member for releasing an electrical supervising signal for indicating and/or controlling purposes.

In one preferred embodiment of the apparatus according to the invention, said radially extending member is a cam member adjustably mounted on the free end portion of the shaft outside said conduit so as to allow a predetermined angular setting of said cam member relatively to said shaft, means being provided for locking said adjustably mounted cam member in the position as set, the apparatus comprising moreover an electrical switch having an operative member in engagement with said cam member.

In another preferred embodiment of the apparatus according to the invention said radially extending member is a contact arm adjustably mounted on the free end portion of said shaft outside said conduit, a circular potentiometer being provided for cooperation with said radially extending contact arm.

Further objects and features of the invention will appear from the following specification when read in conjunction with the accompanying drawings in which said two preferred embodiments are illustrated by way of example and in which.

Figure 1:
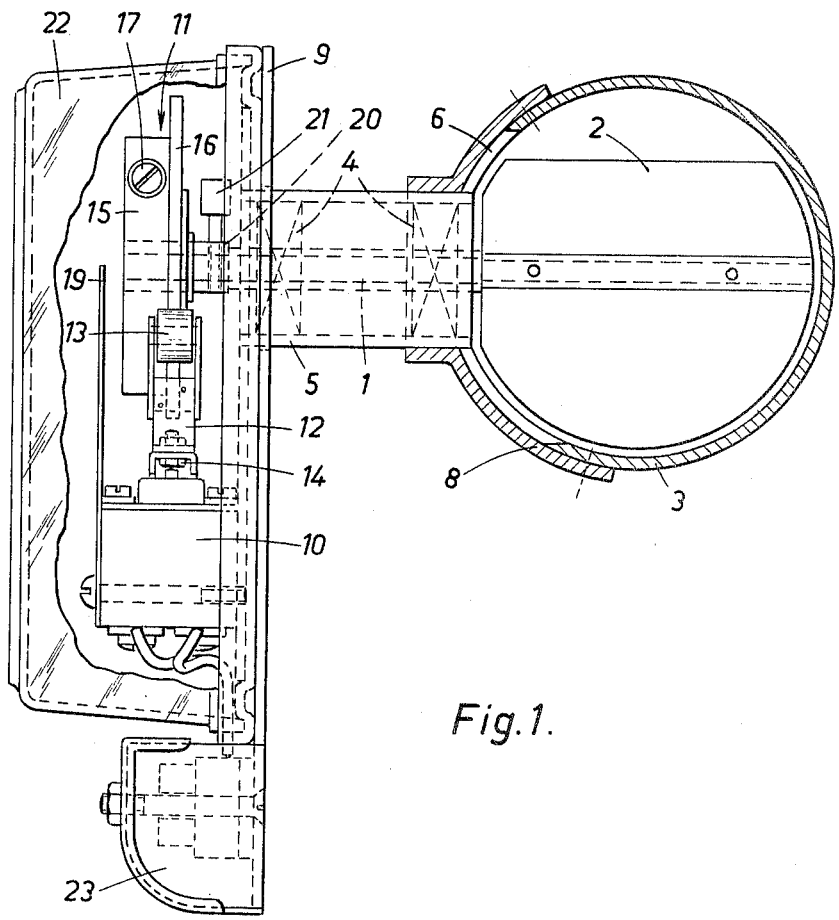
FIG. 1 is a side view of said first embodiment of the supervising apparatus according to the invention, partially in cross-section and with a cross-section of the conduit.
Figure 2:
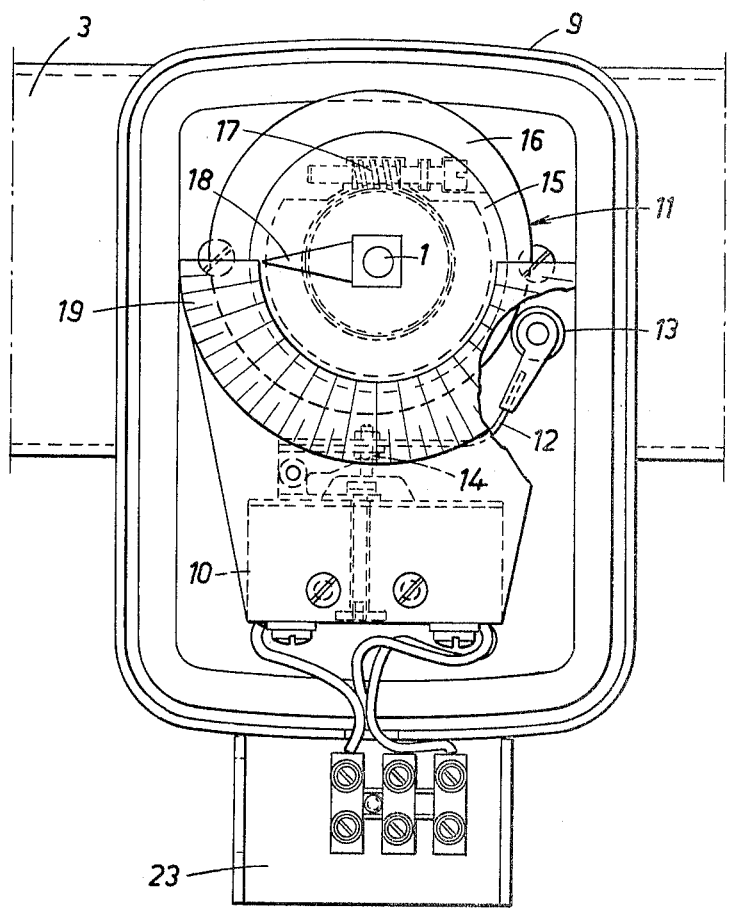
FIG. 2 is a front view of the apparatus according to FIG. 1.
Figure 3:
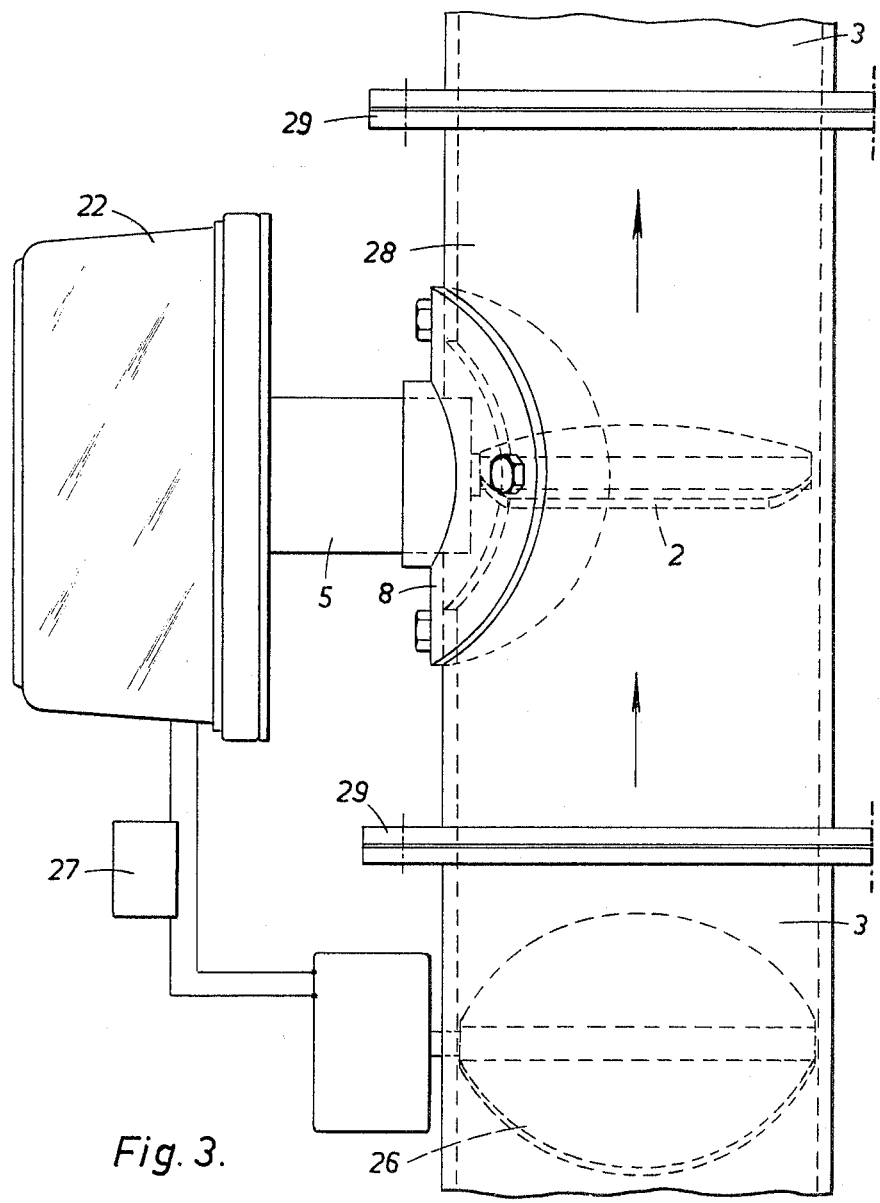
FIG. 3 is a diagrammatic view of the apparatus shown in FIG. 1 together with a pipe section adapted to be inserted into the conduit.

As illustrated in the drawings and particularly in FIGS. 1–3, the apparatus according to the invention comprises a shaft 1 carrying a measuring vane 2 at one end. The vane 2 is disposed in the flow path of a fluid medium, e.g. fresh air, passing through a conduit 3. Preferably the vane 2 has a configuration substantially corresponding in shape to the internal cross-section of the conduit, i.e. for instance, the vane 2 will be circular for use in a conduit with circular cross-section. However, a segment of the circular vane is cut away so that the flowing medium will act unsymmetrically on the vane. It is also preferable that the shaft 1 extends diametrically within the conduit.

At a portion intermediate its ends the shaft 1 is rotatably journalled in one or more bearings 4 mounted in a bearing sleeve 5. The shaft 1 with the vane 2 is inserted into the conduit 3 through a slot 6 in the wall of said conduit, and preferably the slot is dilated in its central portion for accommodating the end of the bearing sleeve 5. Secured to the bearing sleeve 5 is a cover 8 for closing the slot 6. The cover 8 is attached to the wall of the conduit, e.g. by means of bolts, and if necessary a sealing means (not shown) may be disposed between the conduit 3 and the cover 8. Another sealing means (not shown) may be provided at the end of the bearing sleeve 5 adjacent to the vane 2.

Attached to the free end of the bearing sleeve 5 is a support plate 9 through which extends the free end of the shaft 1, i.e. the end opposite to the end carrying the vane 2. At its free end the shaft 1 carries a radially extending cam member 11 for operating a switch 10, mounted on the support plate 9. The cam member 11 is adapted to actuate the switch 10 when in one or more angular positions and thereby to cause a breaking or closing of an electrical circuit extending to an electrically operated valve 26 and/or an alarm or visual indication device 27.

In the embodiment shown in FIGS. 1–3 the switch 10 is a micro-switch provided with a lever 12. In one end the lever 12 is pivotably mounted on the micro-switch 10 and at its other end said lever carries a rotatable roller 13 for following the cam surface of the cam member 11. For operating the contacts of the micro-switch 10 the lever 12 is provided with an adjustable abutment 14 intermediate its ends.

In order to perform a very exact setting of the angular position or positions of the cam member 11 on the shaft 1, at which the switch 10 is to be actuated, the cam member 11 is angularly adjustable relatively to the shaft 1. As may be seen from the drawings the cam member 11 includes a circular mounting plate 15 integrally secured to the end of the shaft 1 and a cam disc 16 operatively connected to the mounting plate 15 and angularly adjustable relatively to the same by means of a worm and worm gear mechanism 17, known per se. The plate 15 may be provided with a mark or pointer 18 for cooperation with an indicia plate 19 secured to the switch 10 or the support plate 9, so as to give a visual indication of the angular position of the shaft 1 and thus of the vane 2 at every moment.

In the embodiment of the apparatus shown in FIGS. 1–3 the cam disc 16 is circular but eccentrically disposed relatively to the axis of the shaft. However it should be appreciated that the cam disc may have any other form suitable for the desired operation of the switch 10.

For counterbalancing the cam member 11 as well as the segment cut away from the vane 2, the shaft 1 is adjacent to its free end provided with a threaded transverse bore 20 for accommodating a radially extending counterweight 21 perferably consisting of a screw with an enlarged head. It will thus be achieved that the vane 2 can be balanced, weightwise, in a very simple manner from outside the conduit 3 to compensate for changes in the density and/or velocity of the fluid medium so as to obtain maximum sensitivity of the supervising apparatus within a predetermined desired range of velocities of the fluid medium.

Although the first embodiment of the apparatus according to the invention is illustrated in FIGS. 1–3 as having only one single cam member operating one single switch 10, it will be understood, however, that also two or more cam members may be mounted on the free end portion of the shaft for operating a corresponding number of switches which in turn control several electrical circuits.

Figure 4:
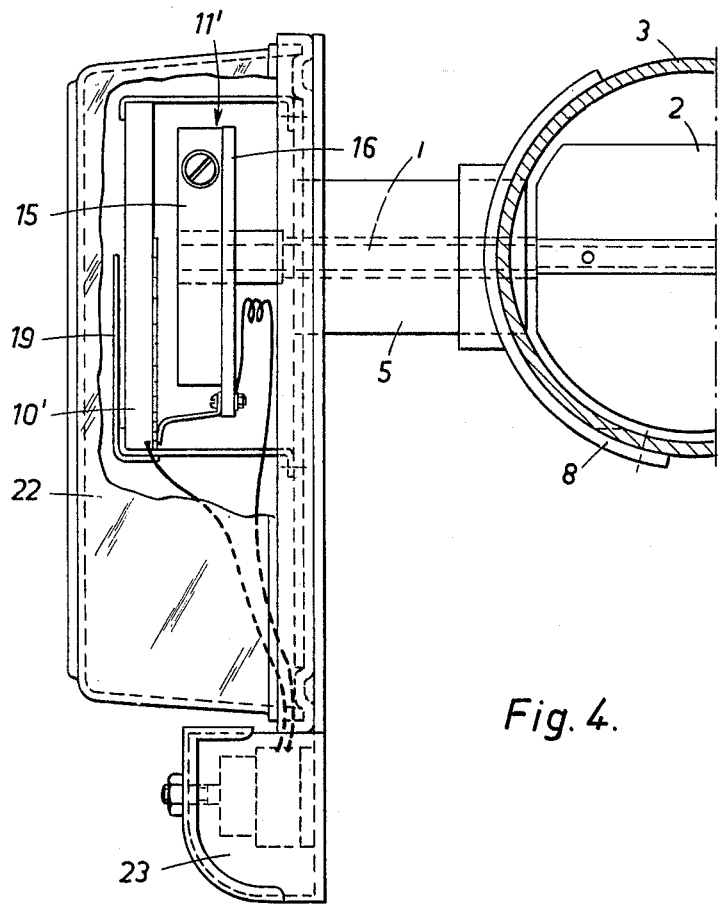
FIG. 4 is a side view similar to FIG. 1 but illustrating a second embodiment of the apparatus according to the invention.

In a second embodiment of the apparatus according to the invention illustrated in FIG. 4, the cam member 11 is replaced by a radially extending contact arm 11' and the switch 10 is replaced by a circular potentiometer 10' for cooperation with said contact arm 11', said potentiometer being mounted on the support plate 9 and comprising a circular row of stationary contacts for successive engagement with the contact on said contact arm.

In both embodiments of the invention, the support plate 9 carries a detachable casing 22 for covering the radially extending member and the electrical contact member. The casing 22 is preferably made of a transparent material such as plastic in order to allow a reading of the pointer and indicia means.

To facilitate the mounting of the supervising apparatus in a conduit, as shown in FIG. 3, it is preferable that the cover 8 is secured to a pipe section 28 of suitable cross-section, said pipe section being provided with flanges 29 or other means for being connected to the conduit.

The apparatus according to the invention operates in the following way. When the flow of the fluid medium in a conduit which is to be supervised and in which the vane 2 is disposed has a desired velocity, the vane 2 occupies an angular position substantially parallel to the direction of flow. If the velocity of the fluid medium for some reason, for example, should a filter become clogged, decreases below a predetermined minimum value for which the apparatus is set, the effect of the fluid medium upon the vane 2 also decreases and the vane 2 turns towards its position transversely to the direction of flow, thereby actuating the switch 10 or the potentiometer 10' through the shaft 1 and the cam member 11 or the contact arm 11' in order to release an electrical indicating signal to an alarm device 27 or a control signal for operating the motor of a throttle 26 or the like. When the flow velocity again increases and exceeds the predetermined minimum value, the vane 2 turns towards the position substantially parallel to the direction of flow, thus operating the switch 10 or potentiometer 10' and interrupting the electrical signal.

It will be understood that by means of giving the cam surface a suitable configuration the cam member can be adapted to actuate the switch 10 in more than one point of the pivotal motion of the vane 2. Of course the apparatus may also be adjusted so as to supervise a desired maximum value of the flow velocity rather than a minimum value.

Owing to the design of the apparatus there is thus provided a very sensitive indication and/or control of the velocity of the flow of fluid medium, and the angular adjustment of the radially extending cam member 11 or contact arm 11' by means of the worm and worm gear mechanism 17 also allows the setting of the desired velocity range with maximum exactness.

The supervising apparatus according to the invention may be used in horizontal and vertical as well as inclined conduits. In inclined and vertical conduits it is sufficient to provide an abutment for the vane 2 in its position transverse to the direction of flow. The shaft 1 of the apparatus may also be disposed vertically or inclined to the horizontal provided the vane 2 is balanced in a suitable way for example, by means of two counteracting helical springs.

Although the invention has been described with a certain degree of particularity, it should be understood that the present disclosure has been made only by way of example and that modifications may be made by those skilled in art without departing from the spirit and scope of the invention as hereinafter claimed. Thus it is evident that the above-mentioned apparatus may be utilized for supervising not only gaseous mediums but also liquid mediums, this only requiring a suitable configuration of the vane and a modified counterbalancing of the vane and the cam member.

I claim:

1. A flow control apparatus for fluid mediums flowing through a conduit, comprising a shaft, means for rotatably mounting said shaft in the wall of said conduit so as to have one end portion extending transversely within said conduit and another end portion extending freely through to the outside of said conduit, a measuring vane attached to the end portion of said shaft inside said conduit, said vane being unsymmetrically disposed with respect to said shaft portion for occupying different angular positions within said conduit under the action of the fluid medium according to the velocity of the same, at least one radially extending cam member adjustably mounted on the free end portion of said shaft outside said conduit so as to allow a predetermined angular setting of said cam member relatively to said shaft, a worm gear secured to said shaft and an associated worm connected to said cam member, said worm and worm gear being adapted to set and lock said cam member in a predetermined angular position on said shaft, said vane and said cam member constituting a system which is substantially balanced weightwise in relation to the axis of said rotatable shaft, at least one electric switch having an operative member in engagement with and operable by said cam member, and electrical circuit means controlled by said switch for releasing an electrical supervising signal when said cam reaches a predetermined position and operates said switch.

2. A flow control apparatus for fluid mediums flowing through a conduit, comprising a shaft, means for rotatably mounting said shaft in the wall of said conduit so as to have one end portion extending transversely within said conduit and another end portion extending freely through to the outside of said conduit, a measuring vane attached to the end portion of said shaft inside said conduit, said vane being unsymmetrically disposed with respect to said shaft portion for occupying different angular positions within said conduit under the action of the fluid medium according to the velocity of the same, at least one radially extending cam member adjustably mounted on the free end portion of said shaft outside said conduit so as to allow a predetermined angular setting of said cam member relatively to said shaft, means for locking said adjustably mounted cam member in the position as set, a radially extending weight adjustably mounted on the free end portion of said shaft for counterbalancing said vane and said cam member weightwise so as to constitute a system which is substantially balanced in relation to the axis of said rotatable shaft, at least one electrical switch having an operative member in engagement with and operable by said cam member, and electrical circuit means controlled by said switch for releasing an electrical signal for indicating and controlling purposes when said cam reaches a predetermined position and operates said switch.

3. A flow control apparatus for fluid mediums flowing through a conduit, comprising a section of a pipe to be interposed in said conduit, an elongated opening in the wall of said pipe section extending transversely to said conduit, a cover for said elongated opening, a shaft, means for rotatably mounting said shaft in said cover in sealed relation thereto, so as to have one end portion of said shaft extending transversely within said pipe section and another end portion extending free outside said cover, a measuring vane attached to the end portion of said shaft inside said pipe section, said vane being unsymmetrically disposed with respect to said shaft portion for occupying different angular positions within said pipe section under the action of the fluid medium according to the velocity of the same, at least one radially extending cam member adjustably mounted on the free end portion of said shaft outside said conduit so as to allow a predetermined angular setting of said cam member relatively to said shaft, means for locking said adjustably mounted cam member in the position as set, said vane and said cam member constituting a system which is substantially balanced weightwise in realtion to the axis of said rotatable shaft, at least one electrical switch having an operative member in engagement with and operable by said cam member, and electrical circuit means controlled by said switch for releasing an electrical supervising signal when said cam reaches a predetermined position and operates said switch.

4. An apparatus as claimed in claim 2, wherein said radially extending weight comprises a screw with an enlarged head, and the free end portion of said rotatable shaft is provided with a threaded bore for adjustably accommodating said screw.

References Cited by the Examiner
UNITED STATES PATENTS

| | | | |
|---|---|---|---|
| 529,191 | 11/1894 | Recknagel | 73—228 |
| 2,347,830 | 5/1944 | Kiburz et al. | 73—228 |
| 2,917,922 | 12/1959 | Morse | 340—239 X |
| 3,162,847 | 12/1964 | Huffman | 200—81.9 X |

FOREIGN PATENTS 703,601  2/1931  France.

RICHARD C. QUEISSER, *Primary Examiner.*

DAVID SCHONBERG, *Examiner.*